US009129040B2

(12) United States Patent
Branson et al.

(10) Patent No.: US 9,129,040 B2
(45) Date of Patent: *Sep. 8, 2015

(54) RECOGNIZING OPERATIONAL OPTIONS FOR STREAM OPERATORS AT COMPILE-TIME

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,531

(22) Filed: May 30, 2014

(65) Prior Publication Data

US 2015/0161289 A1 Jun. 11, 2015

Related U.S. Application Data

(63) Continuation of application No. 14/102,614, filed on Dec. 11, 2013.

(51) Int. Cl.
G06F 9/45 (2006.01)
G06F 17/30 (2006.01)
(52) U.S. Cl.
CPC .................. *G06F 17/30958* (2013.01)
(58) Field of Classification Search
CPC ........................................ G06F 8/443
USPC ................................ 717/140–167
See application file for complete search history.

(56) References Cited

U.S. PATENT DOCUMENTS

| 6,523,172 | B1 | 2/2003 | Martinez-Guerra et al. |
| 6,757,894 | B2 | 6/2004 | Eylon et al. |
| 7,058,936 | B2 | 6/2006 | Chilimbi et al. |
| 7,107,585 | B2 * | 9/2006 | Berent et al. .................. 717/154 |
| 7,613,848 | B2 | 11/2009 | Amini et al. |
| 7,644,110 | B2 | 1/2010 | Nishizawa et al. |
| 7,707,564 | B2 | 4/2010 | Marvin et al. |
| 7,823,063 | B2 | 10/2010 | Ramani et al. |
| 7,917,900 | B2 | 3/2011 | Rajamani et al. |
| 8,095,690 | B2 | 1/2012 | Kashiyama et al. |
| 8,321,865 | B2 | 11/2012 | Amini et al. |
| 8,332,809 | B2 | 12/2012 | Mauceri, Jr. et al. |
| 8,364,946 | B2 | 1/2013 | Ishebabi |
| 8,560,526 | B2 | 10/2013 | Santosuosso et al. |

(Continued)

OTHER PUBLICATIONS

Kuacharoen, P.; Mooney, V.J.; Madisetti, V.K., "Software streaming via block streaming," Design, Automation and Test in Europe Conference and Exhibition, 2003, pp. 912-917, 2003.*

(Continued)

*Primary Examiner* — Satish Rampuria
(74) *Attorney, Agent, or Firm* — Scott A. Berger; James R. Nock

(57) ABSTRACT

A source code that includes an operator graph that includes a plurality of processing elements, each processing element having one or more stream operators is received. A metadata tag describing a customization of at least one of the one or more stream operators having a windowing processing operation is parsed from the source code. The source code of the streaming application having the windowing processing operation based on the metadata tag is compiled.

10 Claims, 6 Drawing Sheets

(56) References Cited

U.S. PATENT DOCUMENTS

| | | | |
|---|---|---|---|
| 8,744,622 B2* | 6/2014 | Porco | 700/244 |
| 8,782,095 B2* | 7/2014 | Al-Khatib | 707/802 |
| 2001/0037399 A1 | 11/2001 | Eylon et al. | |
| 2007/0074195 A1 | 3/2007 | Liao et al. | |
| 2007/0169050 A1* | 7/2007 | Barsness et al. | 717/151 |
| 2007/0283336 A1* | 12/2007 | Gschwind et al. | 717/148 |
| 2008/0134158 A1* | 6/2008 | Salz et al. | 717/148 |
| 2009/0313614 A1 | 12/2009 | Andrade et al. | |
| 2010/0106950 A1 | 4/2010 | Hou et al. | |
| 2010/0287295 A1 | 11/2010 | Schaffa et al. | |
| 2010/0293532 A1 | 11/2010 | Andrade et al. | |
| 2011/0041133 A1* | 2/2011 | Amini et al. | 718/102 |
| 2011/0314459 A1 | 12/2011 | Husbands | |
| 2012/0036514 A1 | 2/2012 | Master et al. | |
| 2012/0218268 A1 | 8/2012 | Accola et al. | |

OTHER PUBLICATIONS

Ranganathan, M.; Schaal, V.; Galtier, V.; Montgomery, D., "Mobile Streams: a middleware for reconfigurable distributed scripting," Agent Systems and Applications, 1999 and Third International Symposium on Mobile Agents. Proceedings. First International Symposium on, pp. 162-175, 1999.*

Javaid, H.; Witono, D.; Parameswaran, S., "Multi-mode pipelined MPSoCs for streaming applications," Design Automation Conference (ASP-DAC), 2013 18th Asia and South Pacific, pp. 231-236, Jan. 22-25, 2013.*

Gedik et al., "Elastic Scaling for Data Stream Processing", IEEE Transactions on Parallel and Distributed Systems, vol. 25, No. 6, Jun. 2014, pp. 1447-1463, © 2013 IEEE. DOI: 10.1109/TPDS.2013.295.

Jacques-Silva et al., "Modeling Stream Processing Applications for Dependability Evaluation", 2011 IEEE/IFIP 41st International Conference on Dependable Systems & Networks (DSN), pp. 430-441, Jun. 2011, © 2011 IEEE.

Tang et al., "Autopipelining for Data Stream Processing", IEEE Transactions on Parallel and Distributed Systems, vol. 24, No. 12, Dec. 2013, pp. 2344-2354, © 2013 IEEE.

Ballard et al., "IBM InfoSphere Streams: Harnessing Data in Motion", Sep. 2010. 360 pages, IBM Redbooks. http://www.redbooks.ibm.com/abstracts/sg247865.html.

Branson et al., "Streaming Delay Patterns in a Streaming Environment", U.S. Appl. No. 13/773,008, filed Feb. 21, 2013.

Branson et al., "Streaming Delay Patterns in a Streaming Environment", U.S. Appl. No. 13/795,997, filed Mar. 12, 2013.

Branson et al., "Recognizing Operational Options for Stream Operators at Compile-Time", U.S. Appl. No. 14/102,614, filed Dec. 11, 2013.

* cited by examiner

RECOGNIZING OPERATIONAL OPTIONS FOR STREAM OPERATORS AT COMPILE-TIME

BACKGROUND

This disclosure generally relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Disclosed herein are embodiments of a method of initializing a streaming application for execution on one or more compute nodes. In various embodiments, the method may include receiving a source code that includes an operator graph that includes a plurality of processing elements, each processing element having one or more stream operators. In addition, the method may include parsing, from the source code, a metadata tag describing a customization of at least one of the one or more stream operators having a windowing processing operation. Furthermore, the method may include compiling the source code of the streaming application having the windowing processing operation based on the metadata tag.

Also, disclosed herein are embodiments of a system for initializing a streaming application for execution on one or more compute nodes. In various embodiments, the system may include a compiler configured to receive a source code that includes an operator graph that includes a plurality of processing elements, each processing element having one or more stream operators. In addition, the compiler may also be configured to parse, from the source code, a metadata tag describing a customization of at least one of the one or more stream operators having a windowing processing operation. Furthermore, the compiler may also be configured to compile the source code of the streaming application having the windowing processing operation based on the metadata tag.

Also, disclosed herein are embodiments of computer program product for initializing a streaming application for execution on one or more compute nodes. In various embodiments, the computer program product may receive a source code that includes an operator graph that includes a plurality of processing elements, each processing element having one or more stream operators. In addition, the computer program product may parse, from the source code, a metadata tag describing a customization of at least one of the one or more stream operators having a windowing processing operation. Furthermore, the computer program product may compile the source code of the streaming application having the windowing processing operation based on the metadata tag.

BRIEF DESCRIPTION OF THE DRAWINGS

Like reference numbers and designations in the various drawings indicate like elements.

DETAILED DESCRIPTION

Figure 1:
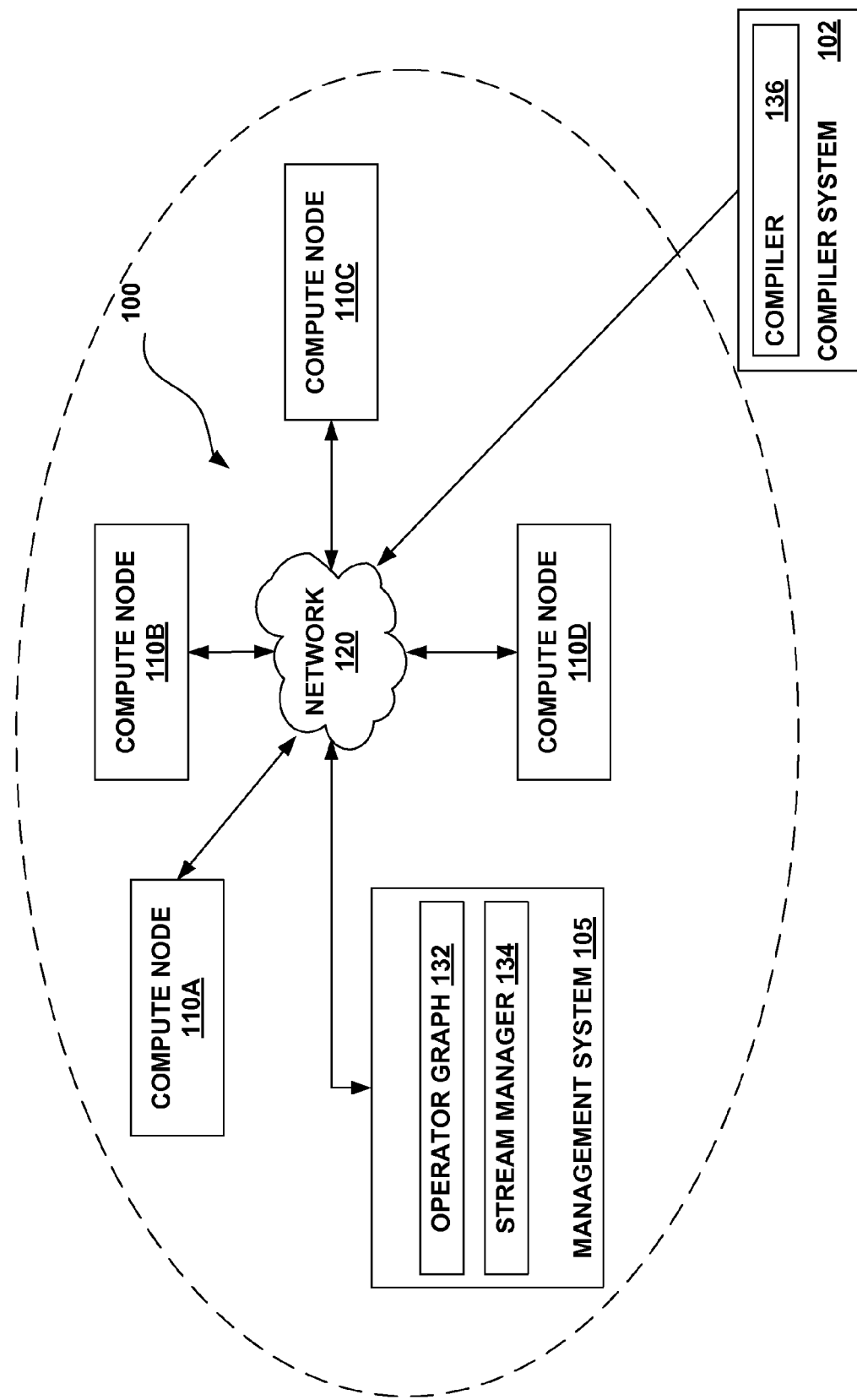
FIG. 1 illustrates a computing infrastructure configured to execute a stream computing application, according to various embodiments.

Stream-based computing and stream-based database computing are emerging as a developing technology for database systems. Products are available that allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that may allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Examples of attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Stream computing applications handle massive volumes of data that need to be processed efficiently and in real time. For example, a stream computing application may continuously ingest and analyze hundreds of thousands of messages per second and up to petabytes of data per day, or more. Accordingly, each stream operator in a stream computing application may be required to process a received tuple within fractions of a second.

A tuple may be received by a stream operator. In some embodiments, the stream operator may process the tuple after an aggregate of tuples are received, e.g., an aggregate stream operator that adds values from one or more stream operator inputs. An aggregate may be interpreted to mean a group of tuples assembled for a particular purpose, according to some embodiments. Furthermore, in some embodiments, the stream operator may perform partition sorting after tuples are received, e.g., a partitioning stream operator that separates values from one or more stream operator inputs. A partition may be interpreted to mean a group of tuples sorted for a particular purpose, according to some embodiments.

One or more processing conditions may be defined using windowing, according to some embodiments. A window, as referred to herein, is a logical container for tuples received by an input port of a stream operator. Windowing may allow for creation of subsets of data within a streaming application. A stream operator may not necessarily support windowing by default. A stream operator may, however, be configured to support windowing. Both tumbling and sliding windows may store tuples according to various conditions. A tumbling window may store incoming tuples until the window is full, then may trigger a stream operator behavior, flush all stored tuples from the window, and then may begin this process again. Conversely, a sliding window may not automatically flush the window when the trigger condition is fulfilled. A sliding window also may have an eviction policy that tells the window when to flush the window and begin this process again. These conditions may be referred to herein as windowing conditions. Windowing conditions may be defined in any number of ways. For example, an application programmer may define one or more specific windowing conditions. Additionally, the system may provide a set of windowing conditions.

Stream computing consists of deploying an application across a multitude of nodes. Some applications have stream operators that may require more processing time than other stream operators. This may create bottlenecks in the operator graph, limiting the necessary throughput, and not allow an application to satisfy system performance requirements. One option to combat streaming operators that take more processing time is to distribute the stream operator workload by creating identical stream operators, segmenting the tuples into multiple substreams, and perform the identical processing operations in parallel. By decreasing the amount of tuples that a stream operator must process, the processing time is decreased and the bottlenecks may be relieved.

However, creating identical stream operators and splitting a stream into multiple substreams for identical processing may change the results of operations. For example, consider a stock trading application where a stream operator calculates the average price of a stock for a group of companies. One tuple may represent an average stock price for one company. The workload may be split-up and identical stream operators may be created, each stream operator calculating the average stock price of the tuples it receives. This may lead to multiple average stock prices being calculated, each one not reflecting the true average stock price for the group of companies.

Furthermore, the processing of stream operators may be limited by the capacity of the node or a central processing unit (CPU) or CPUs, on which the stream operator is hosted. If identical stream operators were created, there may be an increased strain on the CPU of a node, causing an increase in the processing time of the stream operators. A CPU may be a processor, as used herein.

To relieve bottlenecks in an operator graph and adhere to the limitations of the capacity of a node, it may be beneficial for a streaming operator to process a set of tuples at a particular time or after a particular condition is met. For example, consider a toll booth application where one stream operator counts the number of vehicles that come through each day. One tuple may represent one vehicle. During rush hour times, there may be a steady stream of vehicles coming through. Therefore, it may be appropriate for the stream operator to count each tuple as it reaches the stream operator. However, during non-rush hour times, the stream of vehicles may be inconsistent and it may be more appropriate to count the tuples once every hour. By delaying the processing operation, the CPU that is used to perform the counting application may be deactivated for the stream operator and the CPU resources may be used for other stream operators in the toll booth application.

Furthermore, in the toll booth application, another stream operator may be responsible for counting the amount of money the toll booth received in a day. The stream operator may wait until the end of the day to count all the money that was received. However, this may create a bottleneck in the toll booth application because of the processing time required for the streaming application to count all the money. Also, the streaming application may generate a heavy demand on the CPU during this time and limit the resources of the CPU to other streaming applications. One possible solution would be to create identical streaming operators that count a subset of the total money collected and then sum the totals together. However, the multiple streaming operators may produce a heavy demand on CPU capacity. Another solution may be for the streaming operator to count the amount received after every 100 vehicles have passed through the toll booth. This may decrease the processing time the streaming operator requires at the end of the day and not produce as heavy a demand on the CPU capacity as the multiple streaming operators.

A compiler, e.g., compiler 136, may be directed by metadata tags to generate customized stream operators in a streaming application with specifications of how and/or when, to perform their processing operations. In software applications, a metadata tag may be a keyword or term assigned to a piece of an information artifact such as a streaming operator. This kind of metadata may add additional value to the information artifact, may help to describe the information artifact, and may be capable of adding features to an information artifact.

Tagging may be the process of adding comments or labels to something, such as a stream operator. Metadata may be tagged onto a stream operator using several different methods. In an embodiment, metadata that specifies an operational option may be tagged onto a stream operator by placing additional statements in the source code of the application. In another embodiment, the metadata may be tagged onto a stream operator through the use of annotations to the source code statements. Annotations may instruct an information artifact, such as a stream operator, to carry out appropriate actions. The annotations may be syntactically distinguishable from the source code and may be omitted from the version of the source code that is displayed to a user. In yet another embodiment, metadata that specifies operational operations for stream operators may be included in a configuration file that is separate from the source code of the application, but references the source code.

A compiler, e.g., compiler 136, as shown in FIG. 1, may parse the metadata tags from the source code of a streaming application. The metadata tags may then direct a compiler, e.g., compiler 136, to generate stream operators that are configured to support window processing operations, to perform their processing operations in certain way and/or at a certain time, directed by the metadata tag. This may allow the stream operators to alleviate bottlenecks in a streaming application and adhere to the CPU capacity of the compute nodes.

For example, consider a streaming operator that has a tumbling window and performs an addition operation of values on an aggregate of incoming tuples. The operator performing the aggregation may already have a specification of how to manage membership of its tumbling window, and when to produce output from the aggregation. But additional specification may be added by metadata tags directing a compiler, e.g., compiler 136, to generate stream operators that control when the operator actually performs its addition operations. There may be three possible window customizations of a stream operator called DP1, DP2, and DP3. In window customization DP1, which may also be referred to as the single-tuple operation, the stream operator may add a value from a tuple as it comes in to the aggregate of tuples being stored in the window. In window customization DP2, which may also be referred to as the multiple-tuple operation, the stream operator may wait till five tuples come in and then add the values from the five tuples to the aggregate of tuples being stored in the window. In window customization DP3, which may also be referred to as the holding operation, the stream operator may delay calculations on the tuples it holds in the window for a set period time. For example, the stream operator may add the values from the tuples stored in the window every hour (assuming it is not required to produce output during that hour). Metadata tags may direct a compiler, e.g., compiler 136, to generate stream operators that perform the addition operation according to window customizations DP1, DP2, or DP3.

The present disclosure may be directed to a compiler, e.g., compiler 136, that may be capable of alleviating bottlenecks in a streaming application by generating customized stream operators that are configured to support window processing operations, to perform their processing operations in certain way and/or at a certain time, directed by metadata tags.

Turning now to the figures, FIG. 1 illustrates a computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 3:
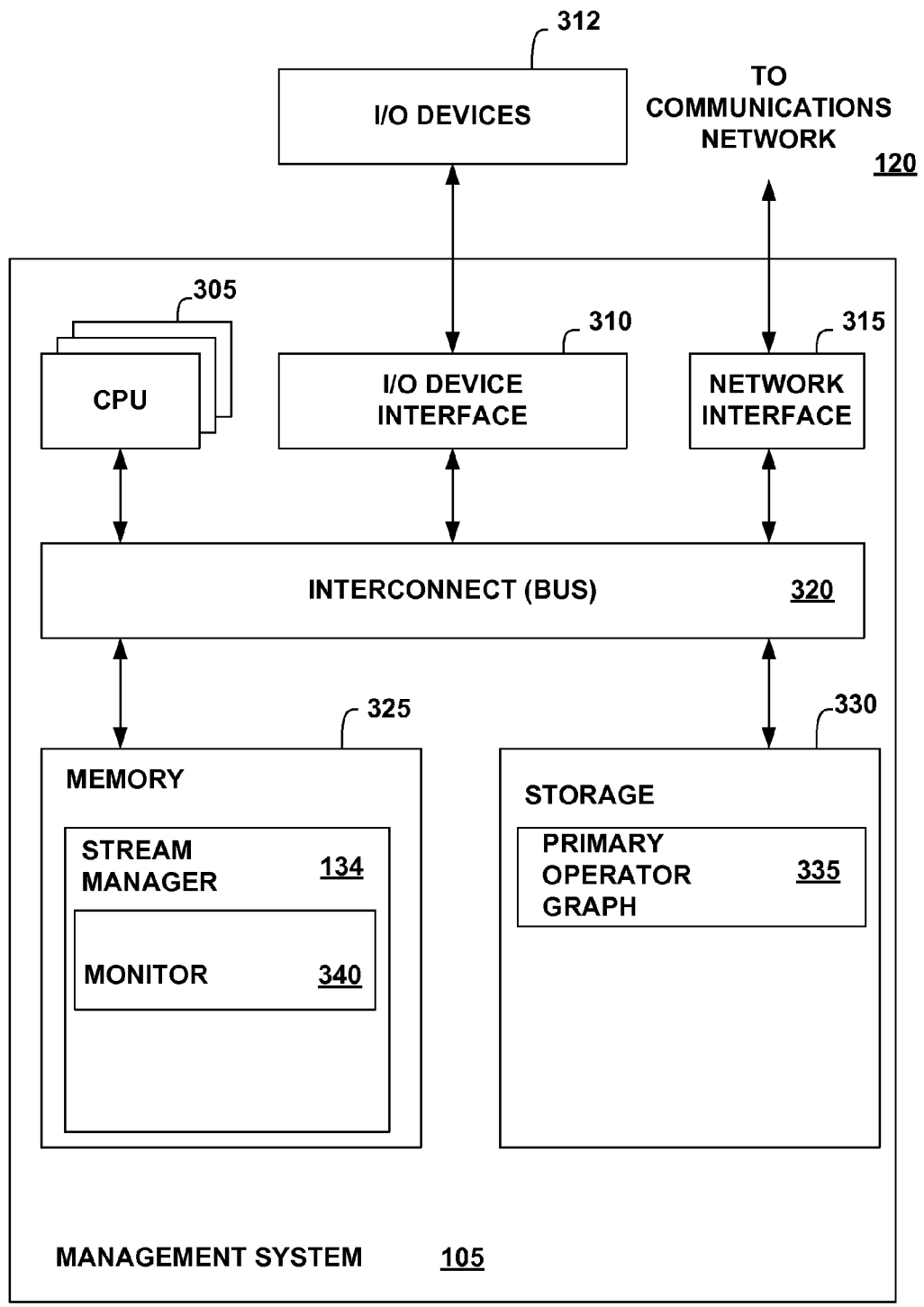
FIG. 3 illustrates a more detailed view of the management system of FIG. 1, according to various embodiments.

The management system 105 can control the management of the compute nodes 110A-110D (discussed further on FIG. 3). The management system 105 can have an operator graph 132 with one or more stream operators and a stream manager 134 to control the management of the stream of tuples in the operator graph 132.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
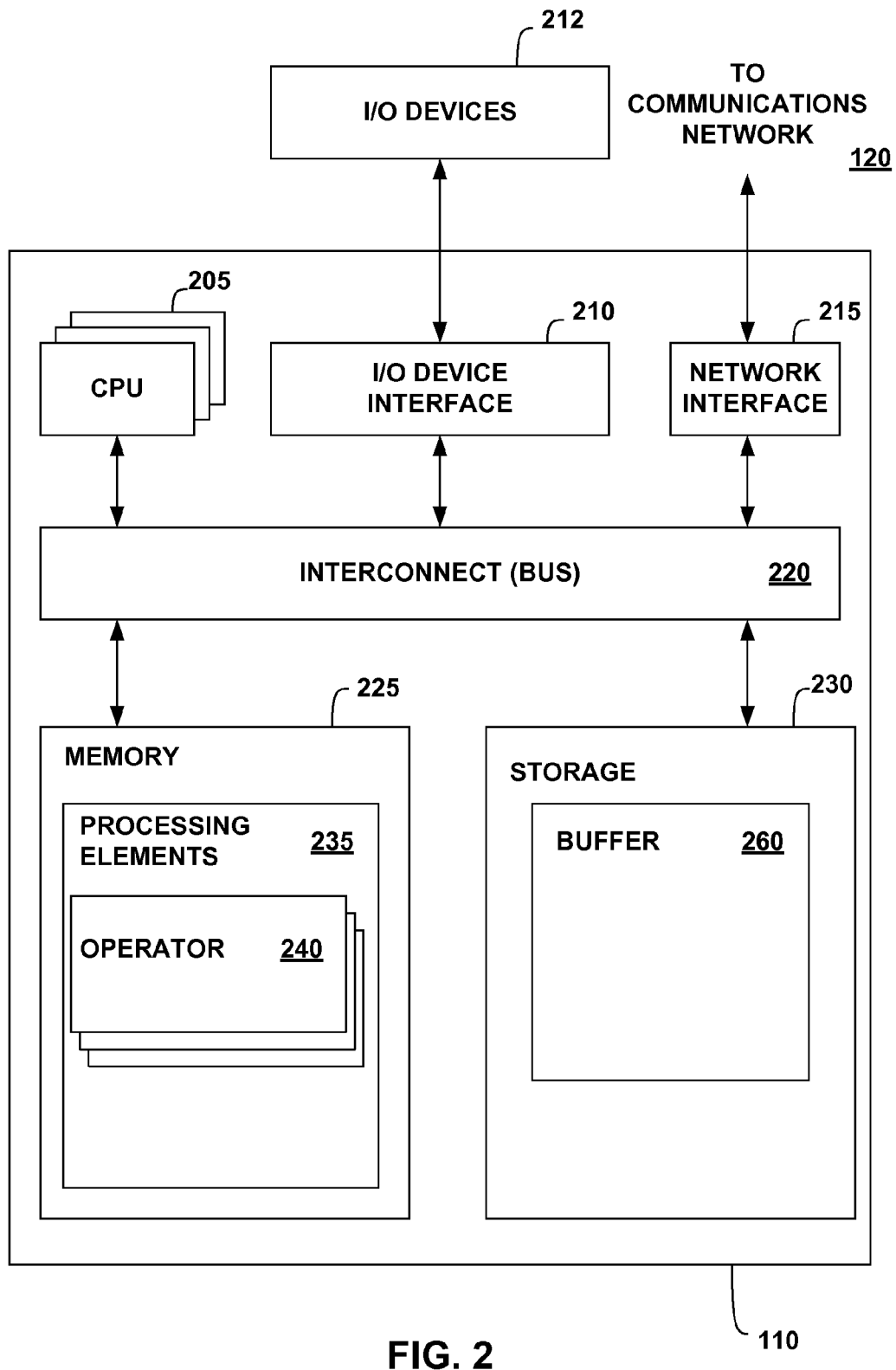
FIG. 2 illustrates a more detailed view of a compute node of FIG. 1, according to various embodiments.

FIG. 2 is a more detailed view of a compute node 110, which may be the same as, or similar to, one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a CPU 205 may be a digital signal processor (DSP). One or more processing elements 235 (described herein) may be stored in the memory 225. A processing element 235 may include one or more stream operators 240 (described herein). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory (RAM), e.g., Static Random Access Memory (SRAM), Dynamic Random Access Memory (DRAM), or Flash. The storage 230 is generally included to be representative of a non-volatile memory, such as a hard disk drive, solid state device (SSD), removable memory cards, optical storage, flash memory devices, network attached storage (NAS), connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 305, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory (RAM), e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (see e.g., FIG. 2) for processing. The stream manager 134 may contain a monitor 340. The monitor 340 may examine the operator graph 132 to determine the amount of data being buffered on a stream operator. The monitor 340 may be a part of the stream manager 134 or act independently.

Figure 4:
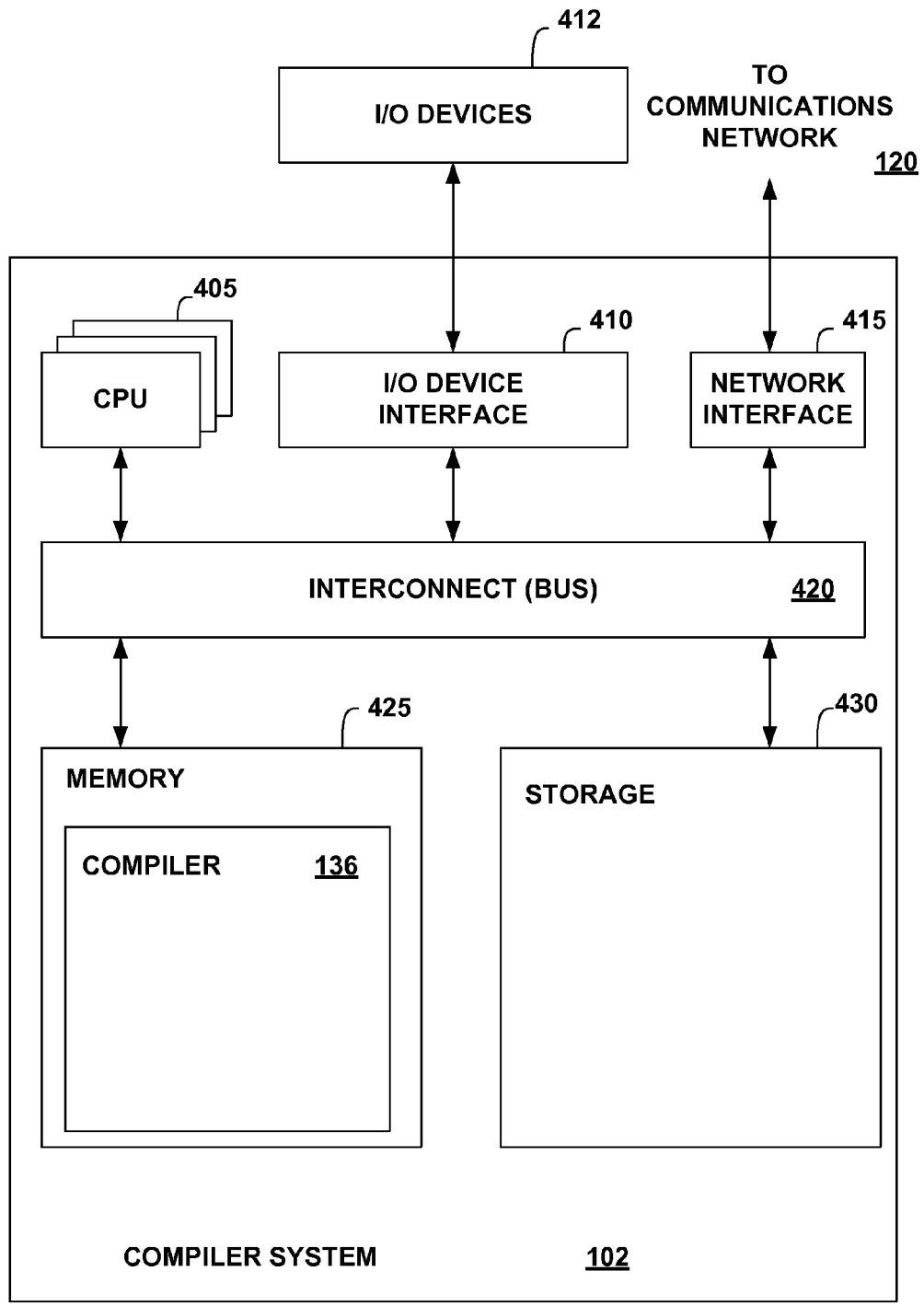
FIG. 4 illustrates a more detailed view of the compiler system of FIG. 1, according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory (RAM), e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

In various embodiments, the compiler 136 can include the window processing operation on a particular stream operator on the operator graph 335 during compile time by writing the window processing operation onto a particular stream operator. In various embodiments, the window processing operation may be included as a default and activated from the stream manager 134. The window processing operation may also be included as an optional feature for a particular stream operator and may be activated by the application.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
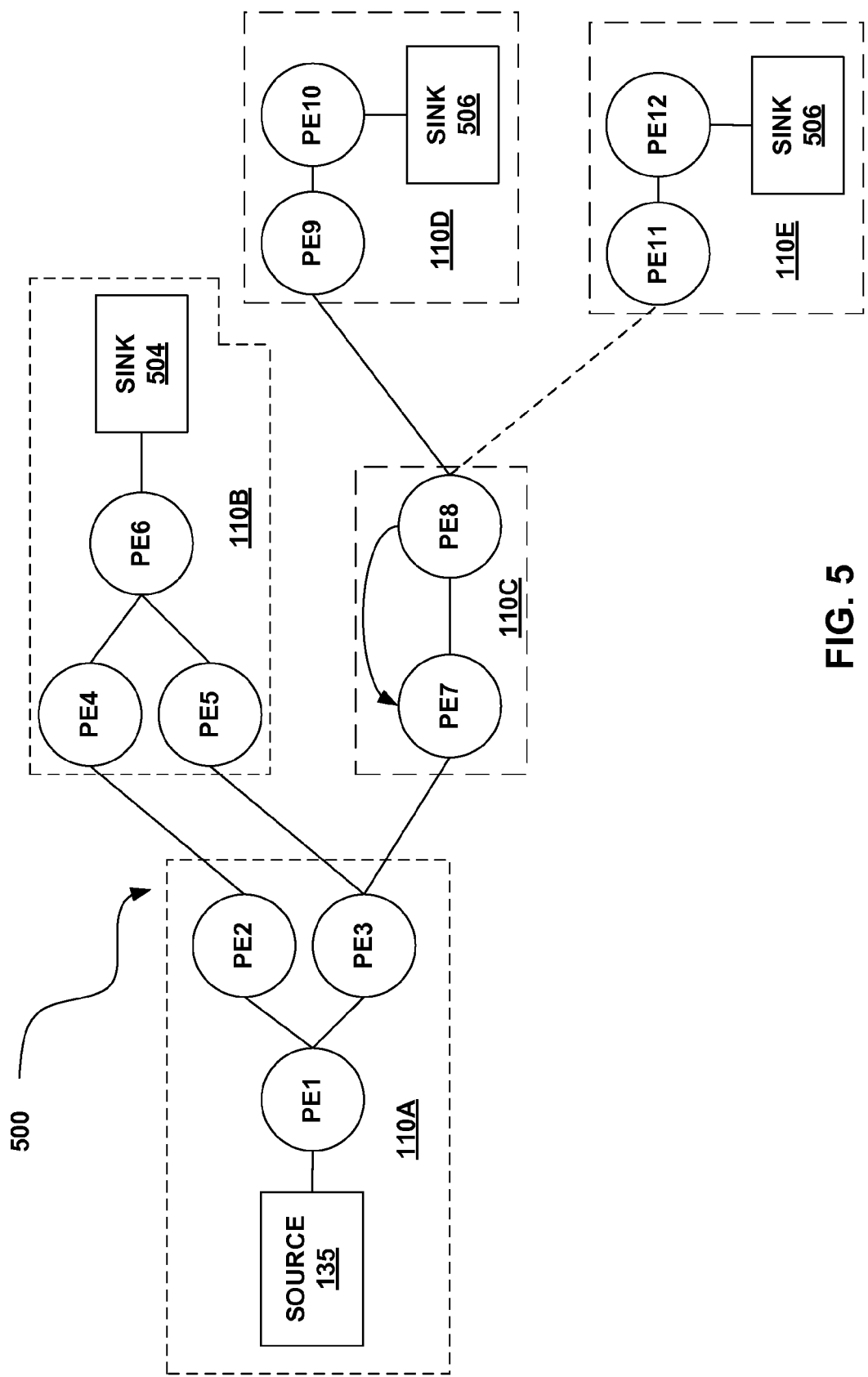
FIG. 5 illustrates an operator graph for a stream computing application, according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE12) running on the compute nodes 110A-110E. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Data that flows to PE2 is processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
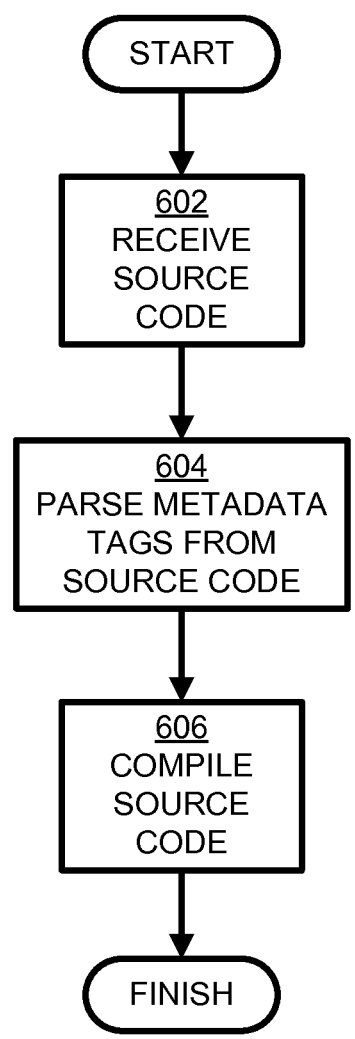
FIG. 6 illustrates a method of initializing a streaming application that has metadata tags for operational options for stream operators, consistent with embodiments of the present disclosure.

FIG. 6 illustrates a method 600 of initializing a streaming application that has metadata tags for operational options for stream operators, consistent with embodiments of the present disclosure. In operation 602, a source code for a streaming application may be received. The source code may encompass metadata tags included through the use of additional statements in the source code, annotations to the source code, configuration files that reference the source code, etc. Furthermore, the source code may include an operator graph that may have a plurality of processing elements and each processing element may have one or more stream operators. The streaming application may be executed on one or more compute nodes. Each compute node may have one or more CPUs. Each CPU may have a capacity that may be limiting to the number of stream operators that may run on a compute node simultaneously.

In operation 604, metadata tags, from the source code, may be parsed. The parsing may occur prior to or during compilation of the operator graph. A metadata tag may direct a compiler to generator customized behaviors for stream operators that support a window processing operation. For example, a metadata tag may direct a compiler to generate a stream operator, which supports a window processing operation, to perform its processing operation using window customization DP1. Compile time directives may include delaying operations until an amount of tuples have been received, delaying operations for an amount of time, delaying operations until a change in an attribute of the tuples occurs, delaying operations until a number of punctuations are received, delaying operations until dynamic connections in the operator graph are established, delaying operations until an amount of the tuples have streamed through a portion of the operator graph, etc. Furthermore, a metadata tag may also direct a compiler to generate a stream operator having a customized run-time behavior to perform operations such as partitioning, sorting, aggregating, etc.

A metadata tag may also direct a compiler to generate a stream operator that supports a first customized behavior at a first time or first situation and a second customized behavior at a second time or second situation. For example, the metadata tag may direct a compiler to generate a stream operator to perform an addition operation using window customization DP1 between 9 a.m. and 10 a.m. and perform the addition operation using window customization DP2 between 11 a.m. and 12 p.m. Furthermore, the customization of the stream operator may be dependent upon the CPU capacity of the compute nodes on which the streaming application is executed. For example, a metadata tag may direct a compiler to generate a stream operator to perform an addition operation using window customization DP2 when the CPU is at a threshold value and perform the addition operator using window customization DP1 when the CPU is below the threshold value.

In operation 606, the source code of the streaming application that includes metadata tags for enabling a customized run-time behavior of a stream operator that support window processing operations, may be compiled. This may alleviate bottlenecks in the streaming application and adhere to the CPU capacities on the compute nodes.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language such as Java, Smalltalk, C++, or the like; (b) conventional procedural programming languages, such as the "C" programming language or similar programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method of initializing a streaming application, the method comprising:
   receiving a source code that includes an operator graph, the operator graph including a plurality of processing elements for executing the streaming application, each processing element having one or more stream operators, wherein the streaming application is executed on one or more compute nodes, and wherein each compute node is adapted to execute the one or more stream operators;
   parsing, from the source code, a metadata tag describing a customization of at least one of the one or more stream operators having a windowing processing operation, wherein the customization is a delay operation within the windowing processing operation, wherein the customization changes from a first customization to a second customization in response to a change in central processing unit capacity on the one or more compute nodes, wherein the windowing procession operation includes one or more windows, and wherein the one or more windows are a logical container for tuples received by an input port of one of the one or more stream operators; and
   compiling the source code of the streaming application having the windowing processing operation, based on the metadata tag.

2. The method of claim 1, wherein the delay operation is designed to delay a stream operator from operating, based on a criterion that is selected from the group consisting of: an amount of received tuples, an amount of elapsed time, a change in an attribute of the tuples, receiving a number of punctuations, establishing dynamic connections in the operator graph, and an amount of the tuples that have streamed through a portion of the operator graph.

3. The method of claim 1, wherein a second processing operation to be performed within the windowing processing operation is also based on the metadata tag.

4. The method of claim 3, wherein the second processing operation is one of partitioning, sorting, and aggregating.

5. The method of claim 1, wherein the customization changes from a first customization to a second customization in response to a change in time.

6. The method of claim 1, wherein the metadata tag is a keyword assigned to a piece of an information artifact.

7. The method of claim 6, wherein the information artifact is a stream operator.

8. The method of claim 1, wherein the one or more stream operators include a customized run-time behavior to perform an operation.

9. The method of claim 8, wherein the operation is selected from the group consisting of: partitioning, sorting, and aggregating.

10. The method of claim 1, wherein the one or more stream operators are fused together to form an executable processing element.

* * * * *